United States Patent [19]

Galerne

[11] 4,427,385
[45] Jan. 24, 1984

[54] MIXED GAS BELL DIVING DEEP OCEAN SIMULATOR

[76] Inventor: Andre Galerne, 4 Cedar Island, Larchmont, N.Y. 10538

[21] Appl. No.: 391,286

[22] Filed: Jun. 23, 1982

[51] Int. Cl.³ .............................................. G09B 9/00
[52] U.S. Cl. .................................... 434/29; 405/185; 434/254
[58] Field of Search ................ 434/29, 219, 247, 254; 73/148; 405/185, 187, 193, 194

[56] References Cited

U.S. PATENT DOCUMENTS

| | | | |
|---|---|---|---|
| 2,784,559 | 3/1957 | Kajmo | 405/193 |
| 2,839,839 | 6/1958 | Hartig et al. | 434/29 |
| 3,323,312 | 6/1967 | Banjavich | 405/193 |
| 3,548,516 | 12/1970 | Lanphier et al. | 434/254 |
| 3,561,137 | 2/1971 | Guyon et al. | 434/29 |
| 4,029,034 | 6/1977 | Mason | 405/185 X |
| 4,094,160 | 6/1978 | Galerne | 405/185 |
| 4,286,896 | 9/1981 | Melitz et al. | 405/185 |

FOREIGN PATENT DOCUMENTS

| | | | |
|---|---|---|---|
| 2053034 | 5/1972 | Fed. Rep. of Germany | 434/254 |
| 2109824 | 9/1972 | Fed. Rep. of Germany | 434/254 |
| 782247 | 9/1957 | United Kingdom | 434/254 |

Primary Examiner—William H. Grieb
Attorney, Agent, or Firm—Curtis, Morris & Safford

[57] ABSTRACT

A mixed gas bell diving deep ocean simulator has particular utility in training of student commercial divers. Required training dives, both air and mixed gas, can be carried out in safety and at a substantial cost savings as compared with in-ocean training dives. The simulator comprises a hyperbaric cylinder serving as a work chamber and a diving bell suspended within the work chamber. The work chamber is flooded so that a portion of the diving bell is submerged. The bell and work chamber are compressed to simulate lowering of the bell to an ocean depth, and are decompressed to simulate raising the bell from that depth. An arrangement is provided for automatically tracking the pressure outside the bell (i.e., in the work chamber) with the pressure in the bell so that the simulated depth in the work chamber corresponds to that of the bell within a predetermined differential (e.g., three feet of sea water).

20 Claims, 6 Drawing Figures

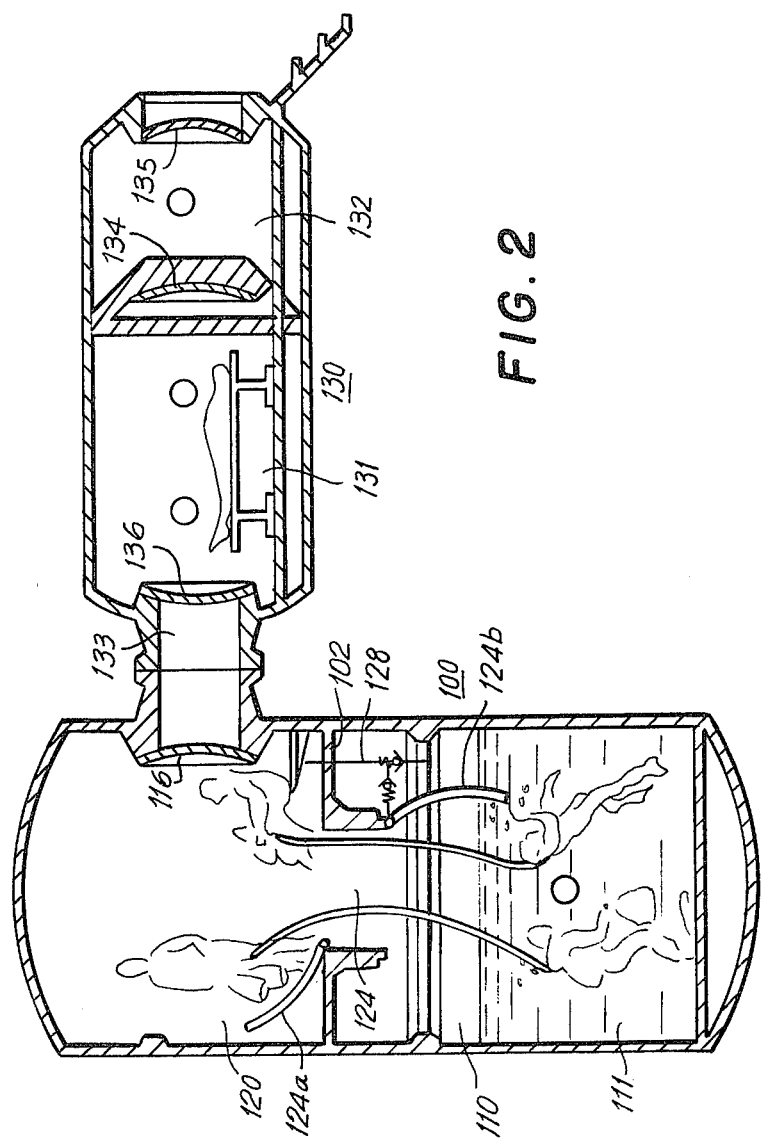

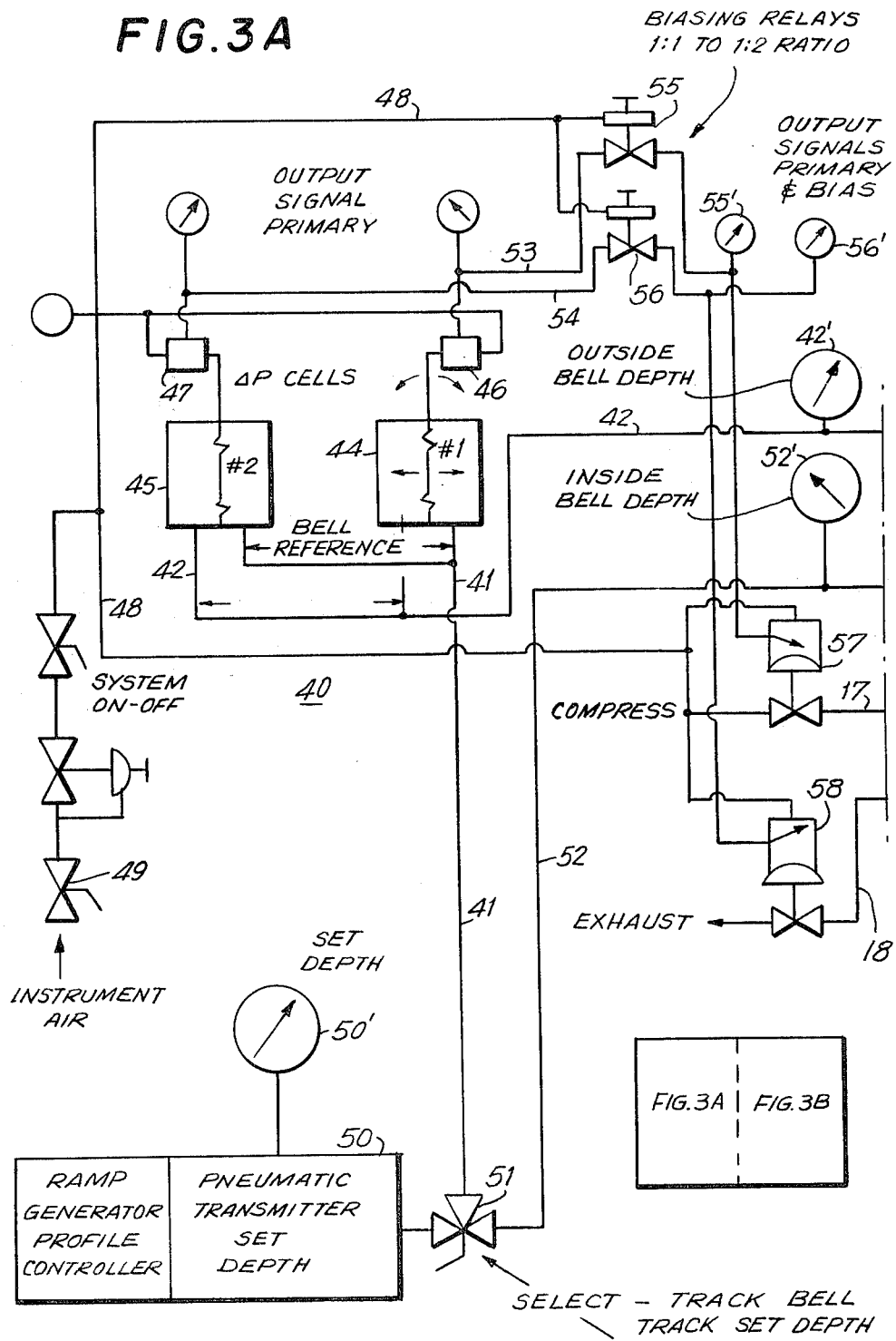

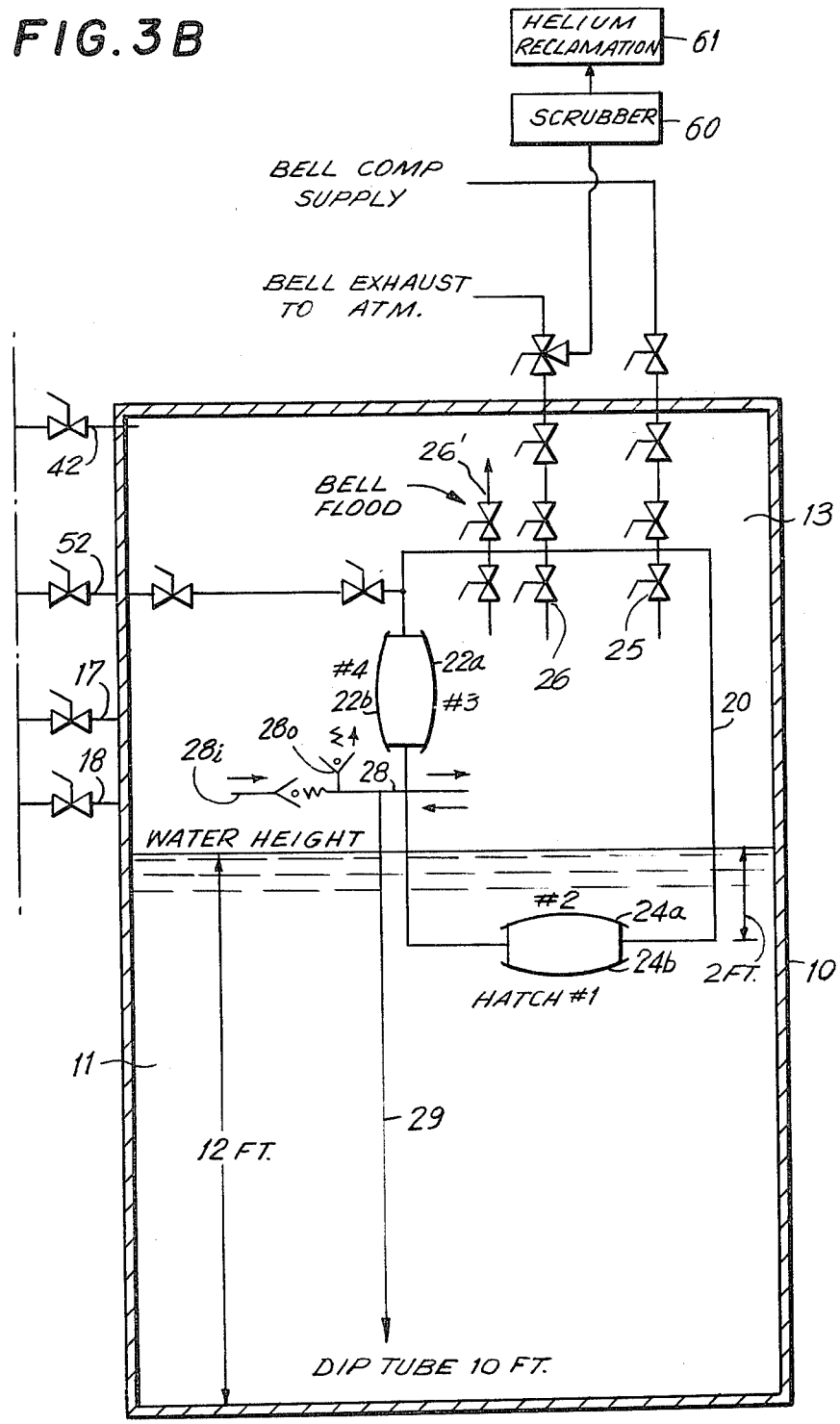

MIXED GAS BELL DIVING DEEP OCEAN SIMULATOR

BACKGROUND OF THE INVENTION

This invention relates to an onshore system for realistically simulating deep ocean conditions, and which is particularly suitable for duplicating in-ocean diving bell operations, so that deep ocean diver training can be carried out without safety hazards typical of actual deep ocean training, and with a significant reduction in costs.

Prior to the late 1960's, deep sea divers learned their trade through on-the-job training or while serving in the armed forces. Underwater jobs and the skills needed to perform them were limited to the technology and requirements of the time. In the past decade, however, a worldwide need for offshore petroleum production has suddenly increased the need for divers and life support personnel trained in deep mixed gas diving operations. To meet this increased demand industry, governments, and private institutions have developed formal diver training programs.

Conventional programs for mixed gas bell diver training utilize substantially the same basic physical plant and curriculum.

In each case, a small bell diving system, consisting of a deck-mounted decompression chamber, a diving bell and its handling system, and the necessary gas storage and management systems, is placed on a water-adjacent pier or on board a floating barge so that the bell may be lowered into the water.

Until recently, all training of this type was conducted at depths shallower than 60 feet because of a lack of deep sheltered water and also because of the prohibitive overhead costs that would be incurred if a floating system were to be towed out into deeper water.

Within recent years, several nations have promulgated training and procedural regulations in an effort to improve diver safety and work performance. In particular, the United Kingdom has produced the most comprehensive regulations to date for all diving operations to be conducted within the U.K. sector of the North Sea.

The training section of the U.K. regulations requires all divers to receive formal training at water depths and exposure times which exceed the capabilities of virtually all institutions presently training mixed gas bell divers.

In order to meet the demand for divers trained to this standard, it was necessary for the British government to subsidize a diver training program. The program utilized a barge-borne diving complex where student divers could make their required deep ocean dives. Unfortunately, because of the expenses involved, the tuition was excessively high, thereby precluding private participation by students. With its government and industry sponsorship wavering in difficult financial times, this training program was unable to meet its high costs and was forced to close.

OBJECTS AND SUMMARY OF THE INVENTION

It is a principal object of this invention to provide a mixed gas deep ocean bell diving simulator for providing an alternative method of diver training which can produce superior graduates at substantially reduced cost.

It is another object to provide a mixed gas bell diving deep ocean simulator in which all aspects of a dive can be completely monitored and controlled by instructors outside the simulator compartment, and in which the student divers are subjected to pressure conditions of an in-ocean deep dive, but are afforded the safety of an onshore facility.

It is still another object of this invention to provide a mixed gas bell diving deep ocean simulator in which both a diving bell and a wetpot work chamber can be compressed and decompressed to realistically simulate deep ocean dive conditions, either as an air dive or as a mixed-gas dive, and in which the pressure (i.e., depth) of the bell and the wetpot chamber automatically track one another.

It is a further object of this invention to provide a mixed gas bell diving deep ocean simulator, as above, in which compressed air is supplied to compress the wetpot work chamber while a mixed gas (i.e., helium-oxygen) is supplied to the diving bell, so that a simulated mixed gas bell dive can be carried out without having to supply the rather expensive mixed gas to the entire bell and work chamber complex.

In accordance with one illustrative embodiment of this invention, there is provided a bell diving deep ocean simulator comprising a large hyperbaric chamber, partially flooded with water, and a diving bell suspended within the large hyperbaric chamber. The large hyperbaric chamber serves as a wetpot work chamber, and may have an entry port in an upper portion thereof. The diving bell may be provided with a side hatchway, through which student divers can enter the bell from the entry port of the work chamber, and an entry hatch at the bottom thereof. In operation, the diving bell is partially submerged in the water in the work chamber, so that the entry hatch is below the surface of the water. This permits the student diver to enter the water to perform a dive in the work chamber at a simulated depth.

A gas supply system controllably supplies compressed air or compressed mixed gas to the diving bell, as required to compress the bell for the particular simulated dive, and also supplies compressed air to compress the wetpot work chamber. An exhaust system is provided for controllably decompressing the bell and the work chamber. The bell and work chamber are compressed to simulate lowering of the bell to an ocean depth and are decompressed to simulate raising the bell from that depth.

An arrangement is also provided for automatically tracking the pressure outside the bell (i.e., in the work chamber) with the pressure in the bell so that the simulated depth in the work chamber and in the bell correspond to one another to within a predetermined differential (e.g., three feet of sea water).

For this purpose a relief assembly is provided, with conduit preferably formed as a tee extending from the inside to the outside of the bell. One pressure relief valve in the conduit opens when the gas pressure in the work chamber is more than the predetermined differential above that of the bell and another pressure relief valve opens when the work chamber pressure is below that of the bell. As a fail safe measure, a vertical pipe extends from the tee downward into the water a distance (e.g., ten feet) exceeding the depth (three feet) corresponding to the predetermined pressure differential.

In a primary compressing mode, the compressed gas is supplied to the bell, and the work chamber is compressed from the bell by gas passing through the relief assembly. Thus, during a simulated descent, the bell pressure remains three feet above the work chamber pressure. To ensure that this differential is not exceeded, the relief assembly is designed to have a capacity exceeding the compression capacity of the gas supply system.

In a primary decompressing mode, the gas is exhausted from the bell to outside the work chamber, either to the atmosphere or to a gas reclamation system. The work chamber is decompressed by bleeding the work chamber air through the relief assembly, into the bell, and out through the bell exhaust system.

An automatic pressure tracking arrangement can also be provided for compressing and decompressing the work chamber in accordance with the pressure in the bell, including first and second differential pressure cells and controllable valves respectively connected to the differential pressure cells and associated with the work chamber supply and exhaust systems. The differential pressure cells are each coupled to a reference conduit and a work chamber conduit. The reference conduit is selectively coupled, through a valve, either to the diving bell or to a reference pressure source, and the work chamber conduit is connected to the work chamber. The differential pressure cells provide respective proportional signals (e.g., signal instrument air pressure) in response to a change in work chamber pressure above and below the reference conduit pressure, respectively. In response, the controllable valves compress or decompress the work chamber, as appropriate, to keep the work chamber pressure close to the selected one of the reference and bell pressures.

The mixed gas bell diving deep ocean simulator of this invention may, in certain embodiments, have a hyperbaric habitat associated with it, so that concurrent training can be carried out in specific aspects of bell diving and saturation diving at pressures to 1000 feet of sea water. The simulator is designed with exterior life-support systems, and gas storage, mixing, and distribution equipment that represent specific piping systems used within the industry to provide both student divers and topside personnel with effective systems training.

While primarily intended for teaching advanced diving techniques, life support systems, and medical procedures, the apparatus of this invention can also be used for training deep air divers, and for bell and saturation orientation for basic commercial diving students.

The above and many other objects, features, and advantages of this invention will become apparent from the ensuing detailed description, when considered in connection with the accompanying drawings.

BRIEF DESCRIPTION OF THE DRAWINGS

FIG. 2 is an elevational section view of another diving simulator, including a work chamber and an associated deck chamber.

FIG. 3 (formed by joining FIGS. 3A and 3B) is a schematic installation diagram showing gas supply and exhaust control systems for the mixed gas bell diving ocean simulator of FIG. 1.

DETAILED DESCRIPTION OF A PREFERRED EMBODIMENT

Figure 1:
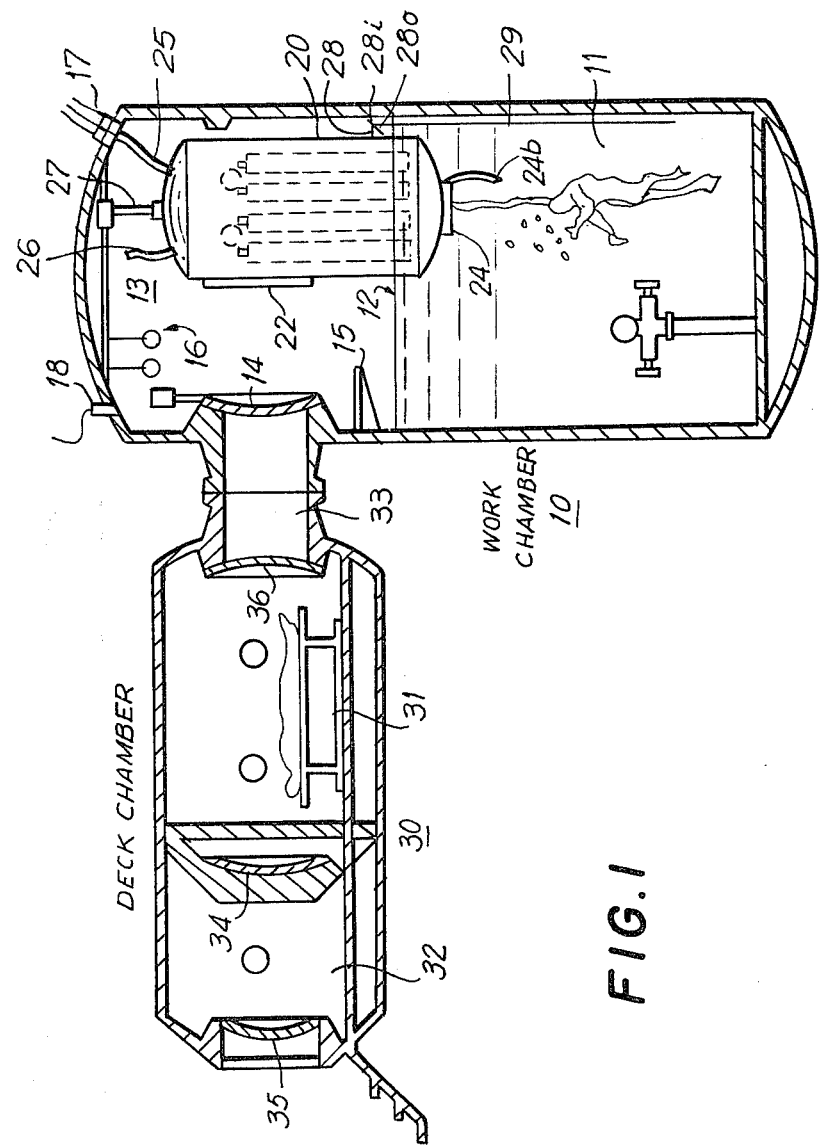
FIG. 1 is an elevational section view of a mixed gas bell diving deep ocean simulator according to this invention, including a work chamber with the diving bell therewithin, and an associated deck chamber.

With reference to the drawings, and initially to FIG. 1 thereof, a mixed gas bell diving deep ocean simulator embodying the present invention has a vertical wet pot cylinder or work chamber 10 with an inside diameter of ten feet and a height of twenty-five feet. The work chamber 10 is flooded approximately half way with water 11, that is, to a depth of approximately twelve feet from the bottom to a surface 12. This leaves an air-filled upper portion 13.

An entry hatch 14 is provided in the upper portion 13, and a platform 15 extends above the water surface 12 inside the work chamber 10 and acts as an instructors station so that a diving instructor can stand on the inside of the work chamber 10 during a simulated dive. Gas mixture and pressure controls 16 are also provided on the inside of the work chamber 10 for the instructor standing on the platform 15.

Gas inlet pipes 17 extend from a controller (not shown) to the work chamber cylinder to pressurize the same, and an exhaust takeoff outlet pipe 18 connects to the controller to permit decompressing of the work chamber 10.

Within the work chamber 10, a diving bell 20 is suspended so as to be partially submerged in the water 11. In this embodiment, the diving bell 20 is a two-man bell formed of a vertical cylinder five feet in diameter, with the lower end of the bell submerged approximately two feet in the water 11. The bell 20 is suspended from the top of the work chamber 10 by means of a pair of vertical rails 27 attached on the inside of the work chamber hull. This permits the bell 20 to be raised or lowered within the chamber 10, as desired.

The diving bell 20 has interior and exterior features which duplicate all the features of an actual diving bell as used in deep ocean work, including bell compression gauges and controls, exhausts, inside/outside depth measurement gauges, primary surface-supplied umbilical gas, and on-board emergency supplies.

Also, exactly as provided on an actual in-ocean diving bell, this diving bell 20 has a side hatchway 22 above the level of the water surface 12, and a bottom entry hatch 24 disposed below the water surface 12. Gas inlet pipes 25 provide gas to the bell 20 to compress the bell, while an exhaust takeoff pipe 26 exhausts gases from the bell for decompressing the same.

A pair of rails 27 permit the bell 20 to be moved vertically within the chamber 10. However, vertical movement can also be simulated by changing the amount of water 11 within the work chamber 10, thereby raising or lowering the water surface 12.

Also shown in FIG. 1 is a bell pressure relief valve assembly 28, formed of a tee-shaped conduit, with a stem passing through the hull of the bell 20 at a point above the water surface 12. The arms of this tee-shaped assembly 28 have excurrent and incurrent relief valves $28_o$ and $28_i$ preset to open whenever the bell pressure is a predetermined differential above or below the pressure in the work chamber 10, respectively.

In its normal operating condition, the bottom hatch 24 of the bell 20 will be located two feet below the water surface 12. However, with the bottom hatch 24 shut, water will not enter the bell while student divers enter the bell through side hatchway 22, as they would on an actual in-ocean bell dive.

Once the divers are inside the bell 20, the pressure in the work chamber 10 and also inside the bell 20 can be increased to simulate descent to an ocean depth. Then, one of the divers can enter the water 11 through the bottom hatch 24, with another diver, acting as bellman, remaining inside the bell 20 to monitor the life support systems, as is the practice in an actual dive.

A closed-circuit television camera (not shown) can be mounted in a pressure-proof housing at the top of the bell 20 or on the roof of the work chamber 10. This camera, provided with a wide angle lens, permits instructors outside the chamber to view the inside bell activity and the work chamber activity, and supplements the usual voice communications. Also, the closed-circuit television camera can be connected with a video recorder for video recording of activities inside the bell. This permits a record of these activities to be retained for later playback to students.

Connected to the work chamber cylinder is a deck chamber 30 formed as a pressurizable horizontal hyperbaric cylinder containing a main lock or habitat 31, an entry lock 32 on one end of the deck chamber 30 remote from the work chamber 10, and a trunk or passageway 33 on the other end of the deck chamber 30 connecting the habitat 31 with the work chamber 10. Hatches 34 and 35 are provided respectively between the habitat 31 and the entry lock 32, and between the entry lock 32 and the exterior of the deck chamber 30. Another hatch 36 is provided on the trunk 33. Accordingly, each of the entry lock 32, the habitat 31, and the trunk 33 is also provided with air supply and exhaust systems, permitting the pressure in any particular chamber to be maintained at a particular level, or to be matched to the pressure of one of the other chambers.

During a training session, the habitat 31 is compressed, for example, at thirty feet of sea water. The entry lock 32 is used to bring food, supplies, or other divers into the habitat 31. In order to ensure that the pressure in the entry lock 32 is never greater than the pressure in the main lock or habitat 31, the hatch 34 is provided with a small gravity-door relief valve (not shown) designed to open at approximately one-quarter inch water pressure differential.

Also provided for training of student divers is a companion diving simulator complex, as shown in FIG. 2. This complex has a similar outward appearance to the simulator of FIG. 1, but is designed for initial student diver training in relatively large classes, that is, up to twelve or more student divers.

In this simulator, a vertical cylinder 100, twenty-five feet in height and ten feet in diameter, is partitioned by means of a horizontal bulkhead 102 into a lower wetpot portion 110 and an upper igloo portion 120.

The igloo portion 120 has the same interior configuration as a twelve-man diving bell, with a side entry hatchway 116 and a lower hatchway 124 with upper and lower hatch doors 124a and 124b leading from the igloo 120 through the bulkhead 102 into the water 111 in the wetpot 110 below. A pressure relief valve assembly 128 permits the wetpot and igloo pressure to track one another, within a predetermined differential.

Associated with this companion diving simulator is a deck chamber 130 including a habitat 131 and an entry lock 132, with a sealable passageway 133 connecting the habitat 131 to the igloo 120. Hatches 134, 135, and 136 are provided for this deck chamber 130, and serve the same function as the corresponding hatches 34, 35, and 36 of the deck chamber associated with the mixed gas bell diving deep ocean simulator.

The diving simulator complex shown in FIG. 2 permits air bell diving training in groups of up to twelve divers, and can simulate most conditions which can be experienced in a large twelve-man bell.

FIG. 3 illustrates a controller system for automatically controlling the pressure in the work chamber 10 of the mixed gas bell diving deep ocean simulator of FIG. 1 by automatically balancing the pressure of the bell 20 and that of the work chamber 10, and also shows, schematically, features of the bell 20.

As shown schematically in FIG. 3, the bell bottom hatch 24 has inner and outer hatch doors 24a and 24b and the side hatchway 22 has similar inner and outer hatch doors 22a and 22b.

The gas intake 25 for the diving bell 20 has valves disposed within the bell 20, inside the work chamber 10, and outside the work chamber 10 for controlling the gas pressure to the bell 20. Similarly, the exhaust takeoff pipe 26 has valves disposed within the bell 20, inside the work chamber 10, and outside the work chamber 10.

In addition, a bell flood pipe 26', controllable both inside and outside the bell 20, is provided for equalizing the pressure inside and outside the bell 20. This permits the hatchway 24 to be flooded, once the hatch doors 24a and 24b are opened, to ease the entry of divers into the water 11.

An automatic differential pressure mechanism 40 has a bell/reference conduit 41 connected to a point providing either the bell pressure or a reference pressure, as selectively determined, and has a work chamber conduit 42 connected inside the work chamber 10.

First and second differential pressure cells have respective differential bellows 44 and 45 which are each connected to the two conduits 41 and 42 to compare the bell or reference pressure with the work chamber pressure. These differential pressure bellows 44 and 45 are respectively coupled to first and second linear valves 46 and 47 which each have an input connected to an instrument air line 48 which is in turn coupled to a source of instrument air 49.

A reference pressure source 50, comprised, for example, of a ramp generator, a profile controller, and a pneumatic output transmitter, provides a reference pressure corresponding to a predetermined set depth. This depth can be adjusted to the level of a predetermined dive, such as 500 feet of sea water. A set depth gauge 50' indicates the level of the reference pressure.

A selecting valve 51 connects the bell reference conduit 41 either to the reference pressure source 50 or to a bell conduit 52 coupled to the interior of the bell 20. An inside bell depth gauge 52' is connected to the conduit 52 and indicates the depth (i.e., pressure) inside the bell 20. Similarly, an outside bell depth gauge 42', coupled to the work chamber conduit 42, indicates the depth (i.e., pressure) in the upper portion 13 of the work chamber 10.

Primary output signal pressure gauges 46' and 47' indicate the output signal air pressure from the linear valves 46 and 47 of with the first and second differential pressure cells. The primary output signal air is respectively supplied from these linear valves 46 and 47 through lines 53 and 54 to biasing relays 55 and 56, respectively, which also have an input coupled to the instrument air line 48. These biasing air relays 55 and 56 preferably have an input:output ratio of 1:1 to 1:2, and can have an adjustable offset. Outputs of the relays 55 and 56 are respectively indicated on output signal gauges 55' and 56', connected to first and second linear control valves 57 and 58. The first linear control valve 57 is connected in line with the gas inlet pipe 17 between a compressed air or mixed gas source (not shown) and the work chamber 10. The second linear control valve 58 is connected in the exhaust line 18 from the work chamber 10 to control the rate of exhaust air flow therefrom.

Also as shown in FIG. 3, the bell exhaust 26 can have a scrubber 60 connected thereto to remove carbon dioxide and waste gases from the gas taken from the bell 20 during decompression, and a helium reclamation arrangement 61 can be connected after the scrubber to segregate helium from the exhaust gases so the same can be reclaimed and later recycled.

Figure 4:
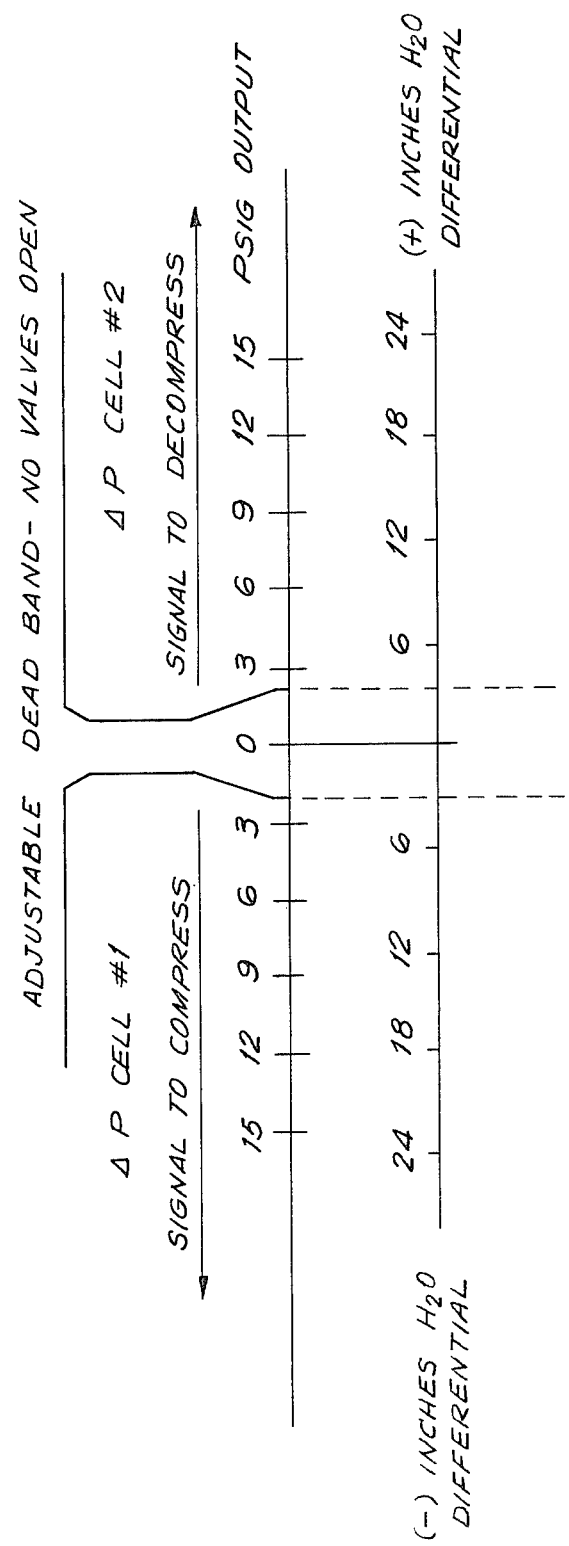
FIGS. 4 and 5 are differential pressure charts for explaining the operation of the systems of FIG. 3.

The differential pressure cells 44, 46 and 45, 47 of the arrangement shown in FIG. 3 generally have the operating characteristic shown in the chart of FIG. 4.

Assuming that the selecting valve couples the bell-/reference conduit 41 to the bell conduit 52, the bottom line in FIG. 4 represents the difference, in inches of water, between the bell pressure (gauge 52') and the outside bell depth (gauge 42'). The first differential pressure cell arrangement 44 and 46 provides a primary signal of zero to fifteen PSIG, proportional to the pressure differential over an input span of zero to twenty-four inches of water when the bell pressure is higher than the work chamber pressure. Similarly, the second differential pressure cell arrangement 45 and 47 provides a primary signal of zero to fifteen PSIG, proportional to the pressure differential over a span of zero to twenty-four inches of water when the bell pressure is below the work chamber pressure. An adjustable dead band is provided, for instance by adjusting the offset of the relays 55 and 56, and signal air is blocked from reaching the linear valves 57 and 58, when the pressure differential is within the dead band.

It should be recognized that the automatic control arrangement including the differential pressure cells 44, 45, 46, 47 and the linear control valves 57 and 58 provides a feedback system which permits tracking of the work chamber depth to either the bell pressure or the reference pressure, based on the pressure differential.

The tracking of the work chamber pressure to the bell pressure can be briefly described as follows:

In a primary compression mode, the bell 20 is supplied with gas (i.e., air) at a specific pressure. The student divers within the bell 20 manually compress themselves within the bell at the maximum rate permitted by the gas supply pressure. The bell pressure relief valve $28_o$ automatically opens as soon as the internal bell pressure is three feet of sea water greater than the pressure within the work chamber 10. This relief valve assembly 28 is dimensioned so as to exceed the supply capabilities of the bell gas supply. As a result, the student divers compress both the bell 20 and the work chamber 10, with the bell 20 maintaining a slightly higher pressure (i.e., three feet of sea water).

Because the gas flows from the bell 20, through the relief valve assembly 28, into the work chamber 10, the work chamber pressure follows, or tracks the bell pressure, and remains within a predetermined differential thereof (in this case, three feet of sea water).

Conversely, in a primary decompression mode, if the divers decompress the bell, for example, at the end of a dive, simply by opening a manual valve associated with the exhaust takeoff pipe 26. This exhausts the bell gas outside the work chamber 10, in this case, directly to the atmosphere. Then, the bell pressure drops in relation to the work chamber pressure, until the bell relief valve $28_i$ opens. Then, the compressed air or mixed gas in the work chamber passes through the relief valve assembly 28, and thence through the bell 20 and out the exhaust takeoff pipe 26.

In this case, the exhaust valve associated with the exhaust takeoff pipe 26 is sized so as to limit both the bell decompression rate and the maximum differential pressure between the bell 20 and the work chamber 10.

The vertical open pipe 29 is preferably at least four inches in diameter and provides a maximum fail-safe positive/negative pressure relief at an equivalent pressure of ten feet of sea water.

A secondary automatic pressure tracking mode utilizes the automatic differential pressure mechanism 40, and permits very fast compression/decompression of the bell 20 and work chamber 10. Compression and decompression under the secondary mode can occur at rates which are much higher than those possible using the primary compression/decompression control modes described above.

In the secondary automatic pressure tracking mode, gas is supplied directly to and taken directly from the work chamber 10 by the remotely positioned linear supply and exhaust control valves 57 and 58. As described hereinabove, these valves 57 and 58 are controlled by a pneumatic force-balance feedback system which continuously compares the bell and work chamber pressures.

In a bell compression phase of this mode, as the bell 20 is manually compressed, the first differential pressure cell 44, 46 senses the differential pressure between the bell 20 and the work chamber 10. Then, the first differential pressure cell 44, 46 produces a primary air output signal which, as shown in FIG. 4, is proportional to this differential. This output signal then opens the linear control valve 57 to admit compressed air directly to the work chamber 10. When manual compression of the bell 20 ceases, the differential pressure cell 44 senses the decline in pressure differential, and the linear control valve 57 begins to close.

The second differential pressure cell 45, 47 is arranged to provide a primary (FIG. 4) output signal in the sense to open the linear control valve 58 and permit exhausting of the work chamber gas 13. The rate of exhausting is proportional to the negative (lower) differential pressure of the bell 20 to the work chamber 10 as the student diver manually exhausts the bell 20.

Operating together, the first differential pressure cell 45, 47 and linear supply control valve 57 and the second differential pressure cell 46, 48 and linear exhaust control valve 58 form a "mirror image" feedback loop which compares bell and work chamber pressures, and maintains the work chamber pressure within a minimum/maximum limit as compared to the manually-controlled bell.

Because of the dead band or null zone, small pressure changes are permitted within the bell 20 as necessary to seal the hatches 24 or to alter the work chamber pressure, and the width of the dead band or null zone can be adjusted, either within the bell or by an instructor outside the work chamber.

An additional feature of the system is that the differential pressure cells 44, 46 and 45, 47 can be selectively biased, for example, to permit an instructor to simulate the effect of "dropping the bell". This can be done by adding an additional signal to compress the work chamber 10 and momentarily to flood the bell 20. Conversely, this biasing procedure can be reversed to simulate the bell 20 being lifted by a winching system, with the expanding gas escaping out of the bell 20. In addition, the selecting valve 51 can be set to connect the conduit 41 to the source 50, rather than to the bell 20. In such case, a reference set pressure, instead of the bell pressure, is used to control the work chamber pressure. Thus, if the reference pressure is controlled over time, the entire pressure chamber complex may be decompressed at a specific rate determined by student or instructor personnel, and the linear control valves 57 and 58 will automatically add or take away the gas pressure, as necessary, in order to maintain the desired "set" depths over time.

Figure 5:
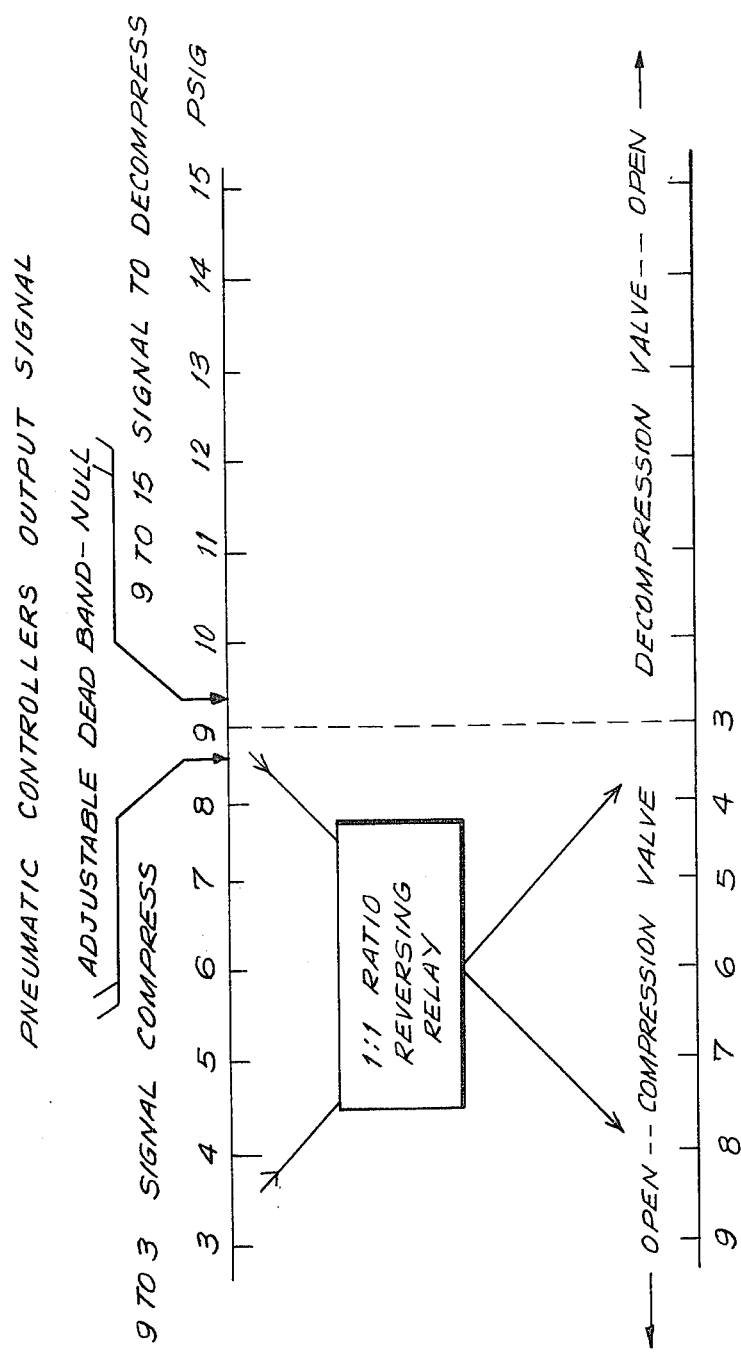

An alternative configuration can be explained with reference to the chart of FIG. 5. In this alternative design, only a single differential pressure cell is used, one side being connected to the bell/reference conduit 41, the other connected to the work chamber conduit 42. The work chamber exhaust control valve 58 is preset to respond to a 9–15 PSIG output signal, with a zero-to-one-hundred-percent linear-open/spring-close configuration. In this case, the decompression or exhaust valve 58 is connected directly to the output of the linear valve 45, 47. Signals below 9 PSIG do not affect this valve.

The compression or supply control valve 57 has its position preset to respond to a 3–19 PSIG signal, and is also configured as zero-to-one-hundred-percent linear open.

In this case, there is mounted between the differential pressure valve 47 and the control valve 57 a 1:1 ratio signal reversing relay, which inverts the output signal from the differential pressure cell valve 47.

Another possible design for the controller system involves the use of pressure converters, mounted directly on the hulls of the work chamber 10 and the diving bell 20, to convert the actual pressure (0–300 PSIG) to a representative low pressure signal (3–15 PSIG). In this case, the differential between the representative low pressure signals for the work chamber 10 and bell 20 would be compared in a conventional representative pressure pneumatic controller.

Also, while a pneumatic control system is shown in the embodiment described hereinabove, equivalent circuits could be electrically or hydraulically controlled.

With the mixed gas bell diving simulator as described hereinabove, the bell 20 and the work chamber 10 can be compressed to any depth equivalent up to five hundred feet or more; therefore simulated deep ocean bell training dives can be carried out in he simulator, avoiding the need for expensive and significantly more hazardous in ocean bell training dives. The student divers in the bell can be exposed to all necessary equipment and procedures, and to an actual in-water diving environment, at gas pressures equivalent to ocean depths of five hundred feet of sea water. All this can be done without the risks normally attendant with conventional barge-mounted diving bell training conducted in the open ocean.

The composition of the water 11 in the work chamber 10 is not limited to sea water, but can be fresh water or any other aqueous environment to which commercial divers are likely to be exposed. Also, the cloudiness or turbidity of the water 11 can be adjusted to simulate actual conditions.

This position of valves both inside the bell 20 and outside the work chamber 10, for example, at a controller panel, permits outside instructor personnel to take over control of bell pressure and of gas mixtures, should that become necessary.

During an air dive, a student diver can "surface" into the gas filled portion 13 of the work chamber 10 in the event that his breathing equipment malfunctions and he is unable to return into the bell 20 via the bottom hatch 24, as would be required in actual in ocean dive. This provides a significant safety feature for the student diver that is unavailable with conventional open-ocean training methods.

Also, in the event of a panic or emergency, an outside instructor or other staff member may "lock-in" through the entry lock 32, the habitat 31, and the trunk 33 into the work chamber 10 to come to the assistance of students within the bell 20. This feature is also unavailable in actual in-ocean bell training, and is therefore regarded as a significant safety feature.

A significant economic advantage of this invention is that a mixed-gas (helium-oxygen) dive can be accomplished at significantly reduced costs. That is, if it desired to have a training dive at extreme depths, i.e. five hundred feet of sea water, a helium-oxygen breathing mixture can be supplied to the bell 20, while air is supplied to compress the work chamber 10. As a result, no more helium is required for a simulated dive than for an in-ocean dive. In addition, the scrubber 60 and helium reclamation unit 61 are connected to the bell exhaust pipe 26, so that the exhausted helium gas can be recovered. This permits a helium gas cost savings of up to 85% as compared to open circuit systems. Because the comparisons involve pressure, rather than gas mixture, and because the helium can be recovered even if it escapes into the work chamber 10, the bell 20 can be pressurized slightly higher than the work chamber 10 so that water may be pushed completely out of the bell 20, as is required according to standard procedures used in the field.

Terms and expressions used hereinabove are intended as terms of description, and not of limitation, and there is no intention in the use of such terms and expressions of excluding any equivalents of the features shown and described or portions thereof. Moreover, many possible variations and modifications of the above-described simulator are possible without departure from the scope and spirit of this invention, as defined in the appended claims.

What is claimed is:

1. Bell diving deep ocean simulator apparatus comprising a pressurizable wetpot work chamber; means for simulating a diving bell within said work chamber, said diving bell simulating means being provided with an entry port such that a person may enter the diving bell simulator means, said diving bell simulator means being operable for said person to execute a simulated dive; and means for adjusting the pressure within the work chamber and diving bell simulator means to simulate lowering or raising the diving bell simulator means to an ocean depth.

2. Bell diving deep ocean simulator apparatus comprising a pressurizable wetpot work chamber; means for simulating a diving bell within said work chamber, having an entry port therein such that a person may enter the diving bell simulating means through said hatch and execute a stimulated dive in said diving bell simulating means; means for controllably supplying compressed gas to said diving bell simulating means and to said work chamber so that the pressure within said diving bell simulating means and within the work chamber may be adjusted to simulate lowering of said diving bell simulating means to an ocean depth and to simulate raising of said diving bell simulating means from said ocean depth.

3. The bell diving deep ocean simulator apparatus, as claimed in claim 1, comprising a pressurizable wetpot work chamber which is provided with a zone adapted to receive water in at least a portion thereof and having a sealable entry port; means for simulating a diving bell within said work chamber, having a sealable entry hatch in communication with the work chamber zone which is adapted to receive water, said hatch being adapted for use by a person for passage between the diving bell simulating means and the zone adapted to receive the water and said diving bell simulating means being adapted for use by the person in a simulated dive; means for controllably supplying compressed gas to said diving bell simulating means and to said work chamber so that the pressure within said diving bell simulating means and within the work chamber may be increased to simulate lowering of said diving bell simulating means to an ocean depth; exhaust means for controllably decompressing said diving bell simulating means and said work chamber to simulate raising of said diving bell simulating means from said ocean depth; and means for maintaining the pressure of the wetpot work chamber and the diving bell simulating means relative to one another to within a predetermined pressure differential.

4. The bell diving deep ocean simulator apparatus, as claimed in claim 1, comprising a pressurizable wetpot work chamber which is provided with a zone adapted to receive water therein and having a sealable entry port; a diving bell suspended within said work chamber, having a sealable entry hatch which is below the surface of the water when the zone of the work chamber contains an amount of water and in communication with said zone such that a person may pass between the diving bell and said zone and said diving bell being adapted for use by a student to execute a simulated dive; means for controllably supplying compressed gas to said diving bell and to said work chamber so that the pressure within said bell and within the water in said work chamber may be adjusted to simulate lowering of said bell to an ocean depth and to simulate raising of said bell from said ocean depth; and means for maintaining the pressure of the wetpot work chamber and the bell relative to one another to within a predetermined pressure differential.

5. The bell diving deep ocean simulator apparatus comprising a pressurizable wetpot work chamber adapted to receive water in at least a lower portion thereof and having a sealable entry port; a diving bell suspended within said work chamber and having a sealable entry hatch therein which is below the surface of the water when an amount of water is in the wetpot work chamber and a sealable hatchway above said surface of the water, said hatchway being adapted for a person to enter the diving bell, said diving bell being adapted for use by the person in a simulated dive and said entry hatch being adapted for passage by the person between the diving bell and the lower portion of the work chamber; means for controllably supplying compressed gas to said bell and to said work chamber so that the pressure within said bell and within said work chamber can be increased to simulate lowering of said bell to an ocean depth; exhaust means for controllably decompressing said bell and said work chamber to simulate raising of said bell from said ocean depth; and means for automatically tracking the pressure of the wetpot work chamber and the bell relative to one another to within a predetermined differential, so that the simulated depth in the wetpot work chamber corresponds to the pressure in said bell.

6. The bell diving deep ocean simulator apparatus, as claimed in claim 3, wherein said means for maintaining the pressure of the work chamber and bell includes means for sensing differential pressure having a chamber conduit coupled to the work chamber and a reference conduit coupled to said bell, means for providing differential signals indicating pressure differentials of said chamber above and below the pressure in said reference conduit, respectively; and controllable valves associated with said gas supply means for said work chamber and with said exhaust means for said work chamber, respectively, for controlling the gas pressure in said work chamber in response to said differential signals.

7. The bell diving deep ocean simulator apparatus according to claim 2, 3 or 4, wherein said gas supply means supplies a mixture of helium and oxygen to said bell and supplies compressed air to said work chamber to compress the same.

8. The bell diving deep ocean simulator apparatus according to claim 7, wherein the exhaust means for said bell includes reclamation means for recovering the helium from the helium and oxygen mixture exhausted from the bell.

9. The bell diving deep ocean simulator apparatus according to claim 1, 2 or 4, wherein the work chamber is provided with station means within the work chamber for an instructor to exercise supervisory control of a person performing the simulated dive.

10. The bell diving deep ocean simulator apparatus according to claim 11, wherein the instructor's station means is disposed above the surface of water within the work chamber and includes gas control means accessible by an instructor at said station for permitting supervisory control of the compressing and decompressing of said diving bell simulator means by said instructor within the work chamber during a simulated dive.

11. The bell diving deep ocean simulator apparatus, as claimed in claim 1, 2, 3 or 4, wherein the wetpot work chamber is provided with a hyperbaric deck chamber having a habitat therein of sufficient size to accommodate at least two persons.

12. The bell diving deep ocean simulator apparatus according to claim 11, wherein the hyperbaric deck chamber is provided with entry lock means for passage into the deck chamber from without the bell diving deep ocean simulator apparatus, a locking passageway connecting the deck chamber and the work chamber, said deck chamber comprising a habitat of sufficient size to accommodate at least two persons.

13. The bell diving deep ocean simulator apparatus according to claim 12, wherein the hyperbaric work chamber is adapted to contain an amount of water in a lower portion thereof and a gas in an upper portion thereof, and the diving bell is provided with a sealable entry hatch at the bottom thereof, said sealable entry hatch being positioned to be submerged in water when the lower portion of the work chamber contains an amount of water.

14. The bell diving deep ocean simulator apparatus according to claim 13, wherein the hyperbaric deck chamber extends substantially horizontally from the work chamber which is substantially vertically disposed.

15. The bell diving deep ocean simulator apparatus according to claim 14, wherein said deck chamber is formed of a horizontal cylinder having the entry lock means in its one end and the passageway in its other end.

16. The bell diving deep ocean simulator apparatus according to claim 13, further comprising means for raising and lowering the bell within said work chamber.

17. The bell diving deep ocean simulator apparatus according to claim 15, wherein said diving bell is formed as a vertical cylinder and has a capacity of two persons.

18. Gas bell diving deep ocean simulator apparatus comprising a pressurizable wetpot work chamber adapted to receive water in the lower portion thereof and a gas in the upper portion thereof; a hyperbaric deck chamber of sufficient size to accommodate at least two persons, said hyperbaric deck chamber being connected to the work chamber by a sealable passageway; means for simulating a diving bell within the work chamber, said diving bell means having a capacity for at least two persons, said diving bell simulator means being provided with a sealable entry hatch which is submerged in the water when the lower portion of the work chamber contains an amount of water; station means within the work chamber for an instructor to exercise supervisory control of a person performing a simulated dive in the diving bell simulator means; means for supplying compressed gas to said work chamber and said diving bell simulator means for adjusting the pressure within the work chamber and diving bell simulator means to simulate lowering or raising the diving bell simulator means to a selected ocean depth; instructor's station means including gas control means for permitting control over adjusting the pressure within the work chamber and diving bell simulator means.

19. The apparatus according to claim 18, wherein the diving bell simulator means comprises a diving bell suspended within the work chamber, said diving bell being movable to a first position in which the sealable entry hatch of the diving bell is submerged below the surface of the water and a second position in which the sealable entry hatch is above the surface of the water when the lower portion of the work chamber contains an amount of water.

20. The apparatus according to claim 19, including means for maintaining the pressure within the work chamber and the diving bell, relative to one another, within a predetermined pressure differential.

* * * * *